United States Patent [19]
Ito et al.

[11] Patent Number: 5,717,543
[45] Date of Patent: Feb. 10, 1998

[54] COMPOSITE MAGNETIC HEAD INCLUDING A SLIDER PLATE AND A BACK BOARD

[75] Inventors: Shinichi Ito, Machida; Ryo Goto, Mouka; Tetsuroh Kawai, Kumagaya; Kiyoshi Nakajima, Oosato-gun; Shuji Koike, Kodamacho; Shuji Sudo, Mouka, all of Japan

[73] Assignee: Hitachi Metals, Ltd., Tokyo, Japan

[21] Appl. No.: 628,093

[22] Filed: Apr. 9, 1996

[30] Foreign Application Priority Data

Apr. 12, 1995 [JP] Japan ................... 7-111289

[51] Int. Cl.$^6$ .................... G11B 5/60; G11B 5/33
[52] U.S. Cl. ............ 360/103; 360/104; 360/123; 360/125
[58] Field of Search .................... 360/103, 104, 360/123, 125, 126

[56] References Cited

U.S. PATENT DOCUMENTS

| 5,255,139 | 10/1993 | Von Huene et al. | 360/103 |
| 5,555,145 | 9/1996 | Kajitani | 360/103 |

FOREIGN PATENT DOCUMENTS

| 5-242448 | 9/1993 | Japan . |
| 5-342515 | 12/1993 | Japan . |
| 6-274826 | 9/1994 | Japan . |

*Primary Examiner*—Jefferson Evans
*Attorney, Agent, or Firm*—Staas & Halsey

[57] ABSTRACT

A slider plate fixing a front magnetic core at a predetermined position is joined and fixed to a back board provided with a back yoke and a coil layer so that a transducer element is constituted by the front magnetic core, the back yoke, and the coil layer, whereby a composite magnetic head is formed.

9 Claims, 6 Drawing Sheets

COMPOSITE MAGNETIC HEAD INCLUDING A SLIDER PLATE AND A BACK BOARD

BACKGROUND OF THE INVENTION

1. Field of the Invention

The present invention relates to a composite magnetic head and a method thereof which is used mainly in the rigid-disk drives of computers, and more particularly a composite magnetic head and a method thereof where a slider having the magnetic head mounted thereon is floated off a magnetic disk at a very small distance so that recording and reproducing can be performed.

2. Description of the Related Art

In order to cope with high transmission rates resulting from the increase in the size of software and the high processing speed of a central processing unit (CPU), small-sized and low-inductance magnetic heads have been demanded. However, a conventional monolithic head or a composite metal-in gap (MIG) head is difficult to make as a small-sized and low-inductance magnetic head because of the manufacturing method or because the winding operation of a coil is required.

On the other hand, a thin film head is easy to make as a small-sized and low-inductance head, but the overwrite characteristic is low and furthermore the problem of side reading or wiggle may occur due to the alignment accuracy in the pole portion or the difficulty of the domain control, and consequently, the track has become difficult to make narrow. In addition, the number of turns of the coil becomes increased in order to increase the output of the narrow track and in some cases the number of turns needs to be increased to more than 40 turns, thus the multi-layer structure of the coil is becoming necessary. If the coil is formed into a multi-layer structure shape, the formed surface will have a large stepped portion and therefore the formation and working of the upper magnetic poles will become increasingly difficult. It is possible to introduce a stepper in order to facilitate the working of the upper magnetic poles, but the stepper is an extremely expensive device and results in an increase in the cost of the thin film head. Moreover, the use of the stepper is not a complete solution and therefore the problem of working accuracy remains unsolved.

In order to solve the aforementioned problems, it has been proposed to use a conventional bulk head in the gap portion of the magnetic head, to use as a coil a thin film coil where the size can be reduced, and to form a magnetic head by combining the bulk head and the thin film coil. For example, Japanese Patent Application Laid-Open No. 5-342515 discloses a magnetic head of the structure where a polycrystalline ferrite back body 52 having a thin film coil 51 is bonded to a front chip 54 including a single crystalline ferrite recording gap 53, as shown in FIG. 9. This structure can solve the problem of the conventional bulk head, that is, the size of the magnetic head can be reduced and the inductance of the magnetic head can be made low. The structure can also eliminate the problem of side reading or wiggle which could not be overcome by the conventional thin film head.

Also, Japanese Patent Application Laid-Open No. 6-274826 discloses a magnetic head of the structure where a thin film coil 57 is provided on the back side of two magnetic core portions 56 provided in a slider board 55 and where the back surfaces of the aforementioned two magnetic core portions 56 are connected by a back-surface magnetic core 58 of a soft magnetic thin film so that the aforementioned thin film coil 57 turns around the connected portion of the back-surface magnetic core 58, as shown in FIG. 10.

As described in the aforementioned prior art, the back body 52 with a thin film coil has been bonded to the front chip including a recording gap (structure of FIG. 9), whereby the size of the magnetic head is reduced and the inductance is made low. However, in this case, since the opposite sides across the recording gap 53 of the front chip 54 are magnetically connected, the whole of the back body 52 is formed from a magnetic substance and is bonded to the back surface of the front chip 54. That is, the magnetic head results in the cause of an increase in inductance and noise, because the front chip 54 and the whole of the back body 52 are formed from a magnetic substance and therefore the magnetic flux spreads over the entire slider.

Also, the magnetic head of the structure (FIG. 10), where two magnetic core portions are connected by the back-surface magnetic core 58, can be formed into a small size. However, the thin film core has to be provided in the slider board having two magnetic core portions, and the cross section of the back-surface magnetic core, connected to the aforementioned magnetic cores, has to be formed into a mountain shape so that it extends from the center of the wound portion of the thin film coil over the wound portion of the thin film coil and is connected to the outer peripheral portion. For this reason, the back-surface magnetic core needs to have a stepped portion, and manufacturing the magnetic head is not easy and the manufacturing efficiency is low. In addition, the manufacture is difficult because the slider plate needs to be arranged correspondence with the mask pattern of the thin film coil.

Furthermore, because the thin film coil and the back-surface magnetic coil are formed on the magnetic core fixed to the slider board by a thin-film process, they will be subjected to various chemicals and heat cycles and therefore there are limitations on the manufacturing process and damages.

SUMMARY OF THE INVENTION

The object of the present invention is to make high-density recording possible by reducing the size of a magnetic head and also to make the manufacture easy, furthermore to make the inductance low.

A composite magnetic head of the present invention comprises a slider plate and a back board. The slider plate is formed with a nonmagnetic substance and is provided with air rails at its recording-medium opposing side. A front magnetic core with a magnetic gap is disposed so that the magnetic gap is opposed to a magnetic recording medium, the magnetic gap being formed by bonding a pair of magnetic substances to a trailing edge of the slider of the slider plate. Also, the point of the front magnetic core is protruded by a required dimension from a side opposite to the recording-medium opposing side of the slider plate. The back board is formed with a back yoke of a soft magnetic film and a coil layer and also is formed with a plurality of electrodes electrically connected to the coil layer, the back yoke and the coil layer being formed on the back board. Furthermore, the slider plate and the back board are joined and fixed so that a transducer portion is constituted by the front magnetic core, the back yoke, and the coil layer.

In the composite magnetic head, a cutout portion is formed in the side opposite to the recording-medium opposing side of the slider plate. The back board can be joined and fixed to the cutout portion.

The coil layer constitutes a coil which is turned around each protrusion portion of the front magnetic core, and the height of the coil layer is formed to the same as a dimension of the protrusion portion or less than the dimension.

The electrodes of the coil layer can be disposed so that a write operation and a read operation can be selectively chosen.

Also, the electrodes can be electrically connected to the coil layer so that the number of turns is increased at the time of the read operation rather than at the time of the write operation.

The back board is formed with a through-hole conductor electrically connected to the coil layer, and the electrodes can be disposed on the side opposite to the recording-medium opposing side and can be electrically connected to the through-hole conductor.

The electrodes can be disposed on a side surface of the back board, excluding a joining surface for joining the slider plate, and the side surface is substantially perpendicular to the magnetic recording medium.

The magnetic recording medium discharge side of the back board overhangs from the slider plate, and the electrodes of the coil layer can be formed on the same plane as the coil layer.

A method of manufacturing a composite magnetic head comprises the steps of: forming a lateral groove in an end portion of a nonmagnetic slider plate in a width direction of the slider plate, the lateral groove having a depth of less than the same degree as the height of a front magnetic core; forming a longitudinal groove in the end portion of the nonmagnetic slider plate in direction crossing with the slider plate at nearly right angles, the front magnetic core being inserted into the longitudinal groove; fixing the front magnetic core to the longitudinal groove by glass material; cutting a side opposite to a recording-medium opposing side of the slider plate in the vicinity of the front magnetic core to form connecting protrusion portions of the front magnetic core; forming a back yoke and a coil layer on a nonmagnetic back board; and superimposing and fixing the back board to the slider plate so that the connecting protrusion portions of the front magnetic core is joined to the back yoke and that the coil layer is turned around the connecting protrusion portions to form a transducer element.

The back yoke and the coil layer, formed on the back board, are made by a thin-film forming method, and an insulating layer is interposed between the back yoke and the coil layer.

In the aforementioned composite magnetic head, since a pair of magnetic core pieces are provided at a predetermined position of the slider plate and are protruded from the back surface of the slider plate, the pair of connecting protrusions can be connected to the back yoke formed into a flat shape. In the connection, the coil of the coil layer is positioned so as to be turned around the connecting protrusion portions. For this reason, a small-sized composite magnetic head corresponding to high-density recording can be easily manufactured. Also, because the coil is constituted by a thin-film coil, the sizes of the magnetic circuit and the coil portion can be considerably reduced as compared with prior art, and consequently, the inductance in a high-frequency band becomes low and the recording and regenerative characteristic of a high frequency can be rapidly enhanced.

In addition, the magnetic head characteristic can be arbitrarily set by providing the electrodes of the coil layer at a predetermined position of turn of the coil. Furthermore, because a through-hole conductor is provided in the back board so as to penetrate the board up and down, an input-output wire can be easily connected to the transducer element from the back surface of the back board, and also a magnetic head can be obtained where there is no possibility that the input-output wire contacts a magnetic recording medium and where reliability is high and manufacturing cost is low.

Furthermore, the slider plate is formed with a nonmagnetic substance and a magnetic substance is provided only in the back yoke of the nonmagnetic back board. Therefore, magnetic flux can be maximally prevented from leaking or getting into from the outside, and an occurrence of noise can be prevented.

Additionally, in the manufacturing method of the present invention, a lateral groove and a longitudinal groove are formed on the end portion of the slider plate and a front magnetic core is fixed to the longitudinal groove. Then, a side opposite to a recording-medium opposing side of the slider plate is cut in the vicinity of the front magnetic core to form a pair of connecting protrusion portions of the front magnetic core. Therefore, the manufacturing is easy. Thereafter, the pair of connecting protrusion portions can be simply connected by a flat-shaped back yoke formed on the back board.

DESCRIPTION OF THE PREFERRED EMBODIMENTS

A preferred embodiment of a composite magnetic head of the present invention will be described with reference to FIGS. 1 through 5.

Figure 1:
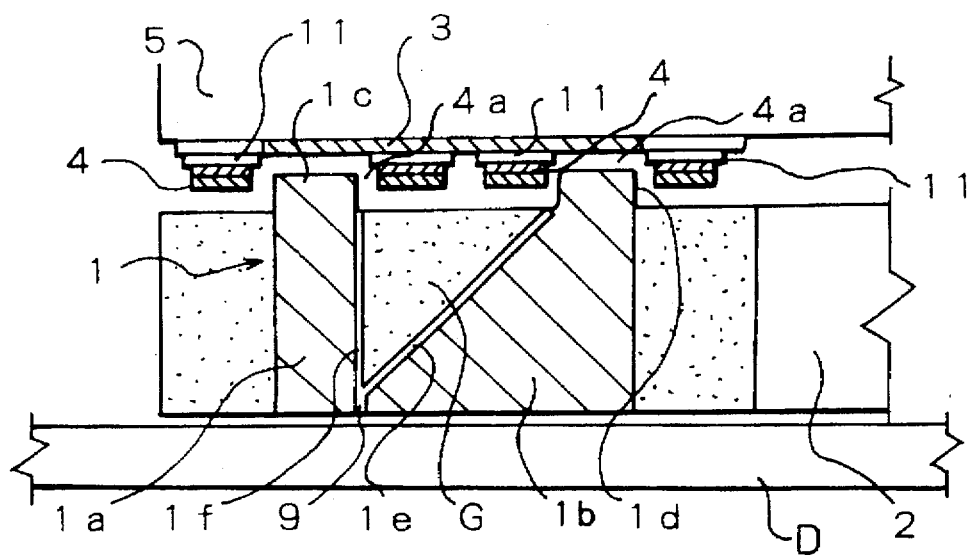
FIG. 1 is a part sectional view of a composite magnetic head of the present invention.

The composite magnetic head, as is shown in FIG. 1, comprises a slider plate 2 having a front magnetic core 1, and a back board 5 having both a back yoke 3 and a spiral coil layer 4. The back board 5 is superimposed and joined to a cutout portion 2a formed on the catalyst discharge side of the top surface of the slider plate 2 (the under surface of the slider plate 2 is opposed to a magnetic recording medium). When the back board 5 is joined to the cutout portion 2a, the back portion of the front magnetic core 1 is connected to the back board 5 by the back yoke 3 to constitute a magnetic circuit. Also, the connecting protrusion portions 1c and 1d of the front magnetic core 1 to be described later is made so that the coil of the coil layer 4 turns around the protrusion portions 1c and 1d, thereby forming a transducer element.

Figure 4:
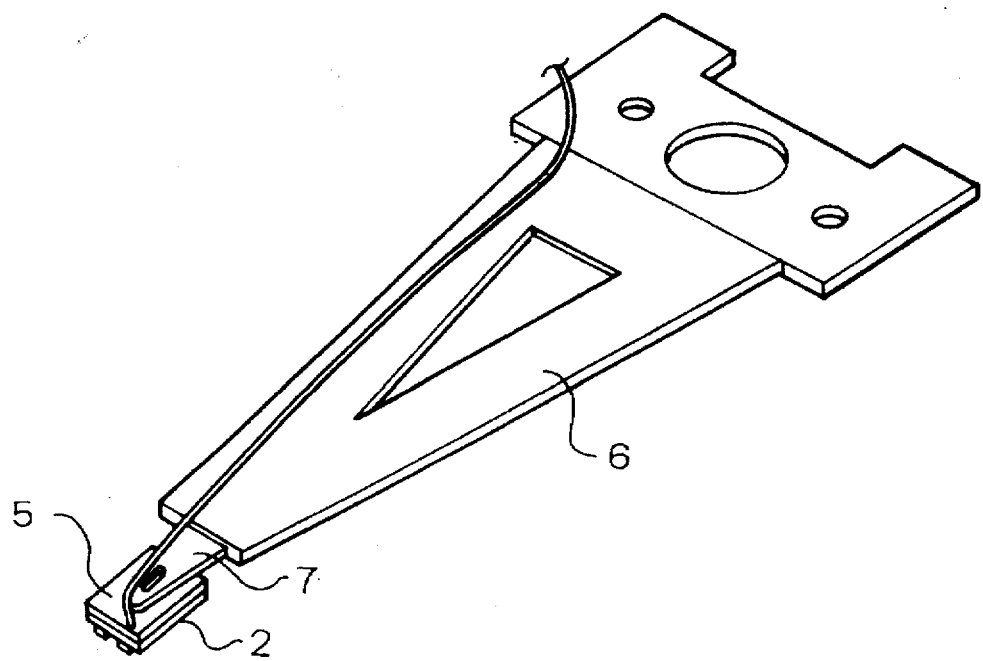
FIG. 4 is a perspective view showing the composite magnetic head of the present invention attached to the hold member of a magnetic disk unit.

The back surface of the back board 5 of the composite magnetic head, as shown in FIG. 4, is bonded and secured to a spring member 7 provided on the point portion of a hold member 6. The slider plate 2 is opposed to a magnetic recording medium D so that a recording operation and a regeneration operation can be performed between the magnetic head and the magnetic recording medium.

The slider plate 2 is made of nonmagnetic ceramic such as CaTiO3. Two air rails 8 are provided in the under surface of the slider plate 2, that is, the surface opposing to the magnetic recording medium. The front magnetic core 1 is inserted into a cut groove provided in the trailing edge of the slider plate of one air rail 8 and is bonded with a glass material G. The front magnetic core 1 is made of monocrystalline ferrite and, as shown in FIG. 1, consists of two magnetic core portions 1a and 1b, which are joined at the side opposing the magnetic recording medium through a gap 9 by the glass material G. Also, the two core portions 1a and 1b are spaced at the back side (side opposite to the under surface opposing to the magnetic recording medium). In addition, the connecting protrusion portions 1c and 1d protruding from the surface of the aforementioned cutout portion 2a of the slider plate 2 to at least the top surface of the coil layer 4 are formed on the side opposite to the magnetic gap 9 so that the slider plate 2 can be easily connected to the back board 5 by the flat back yoke 3. The height of the coil layer 4 is made equal to or less than the dimension of the connecting protrusion portions 1c and 1d so that the connecting protrusion portions 1c and 1d can be connected with certainty to the back yoke.

Figure 3:
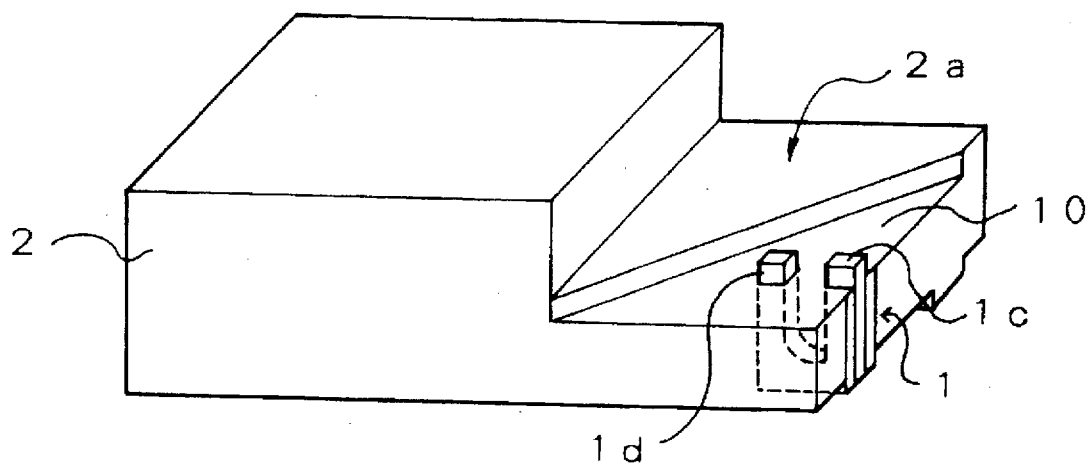
FIG. 3 is a perspective view of the slider plate of the composite magnetic head of the present invention.

To form the connecting protrusion portions 1c and 1d, the vicinity of the front magnetic core of the slider plate 2 is formed into a cut-out groove 10, as shown in FIG. 3. Also, although the magnetic core portions 1a and 1b constituting the front magnetic core 1 are asymmetrical in FIG. 1, forming the core portions into the same shape is convenient from the manufacturing point of view. Furthermore, magnetic thin films 1e and 1f may be provided in the gap 9 of the front magnetic core 1 to enhance the magnetic head characteristic.

The back board 5 comprises a nonmagnetic plate and is provided with the flat back yoke 3 in correspondence with the position of the front magnetic core 1 provided on the slider plate 2. The back yoke 3 is formed with a metal magnetic film and is provided with an insulating layer 11 on the surface. On the surface of the insulating layer 11, the spiral coil layer 4 with a center hole 4a is provided. Then, the back board 5 is superimposed and joined to the slider plate 2 so that the connecting protrusion portions 1c and 1d of the front magnetic core 1 can be inserted into the center holes 4a of the coil layer and joined with the back yoke 3. The coil layer 4 is balanceably wound so that it has the turning portions of the outer circumferences of two center holes 4a to turn the coil layer around the two connecting protrusion portions 1c and 1d. With the balance wind, the turning portions of the coil layer are wound in opposite directions and the numbers of turns are the same number or substantially the same. The induction magnetic fields of the turning portions become opposite, so they are cancelled out with each other and an inductance as a magnetic head characteristic can be reduced. In addition, a NiFe alloyed film is widely used as the metal magnetic film of the back yoke 3 in view of transmissivity and magnetostriction, but an alloyed film consisting of three elements, Co, Ta and Zr, is more suitable for a high frequency region.

Figure 2:
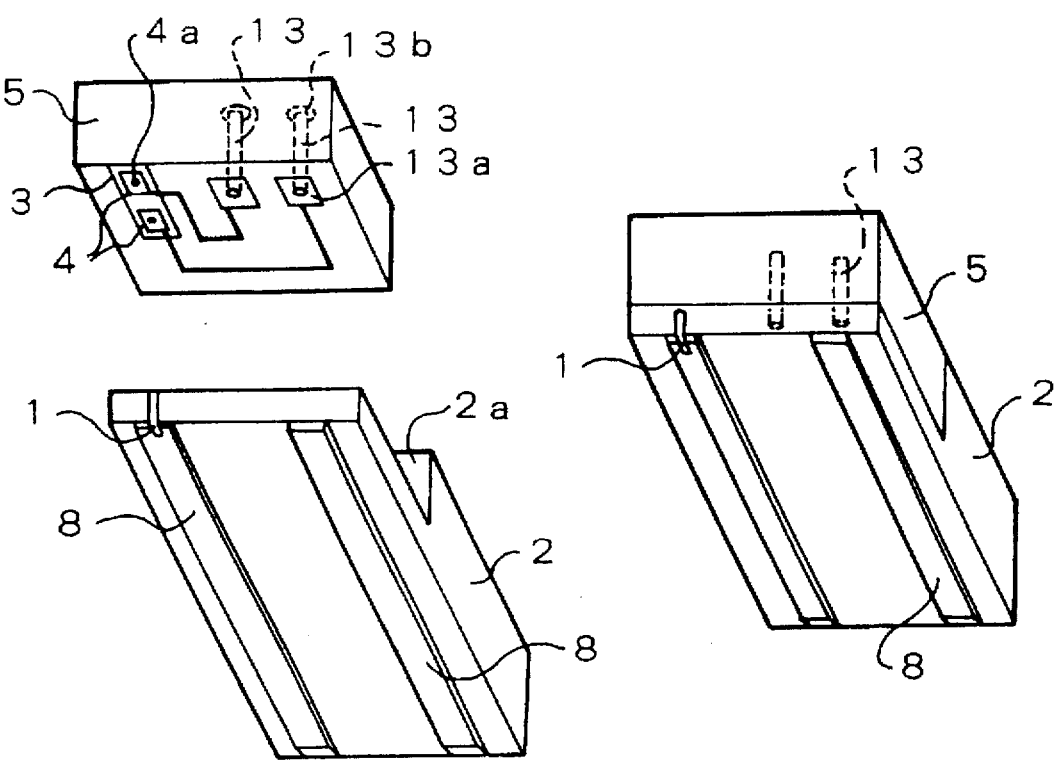
FIG. 2 is a perspective view showing the exploded state and the assembled state of the composite magnetic head of the present invention.
Figure 5:
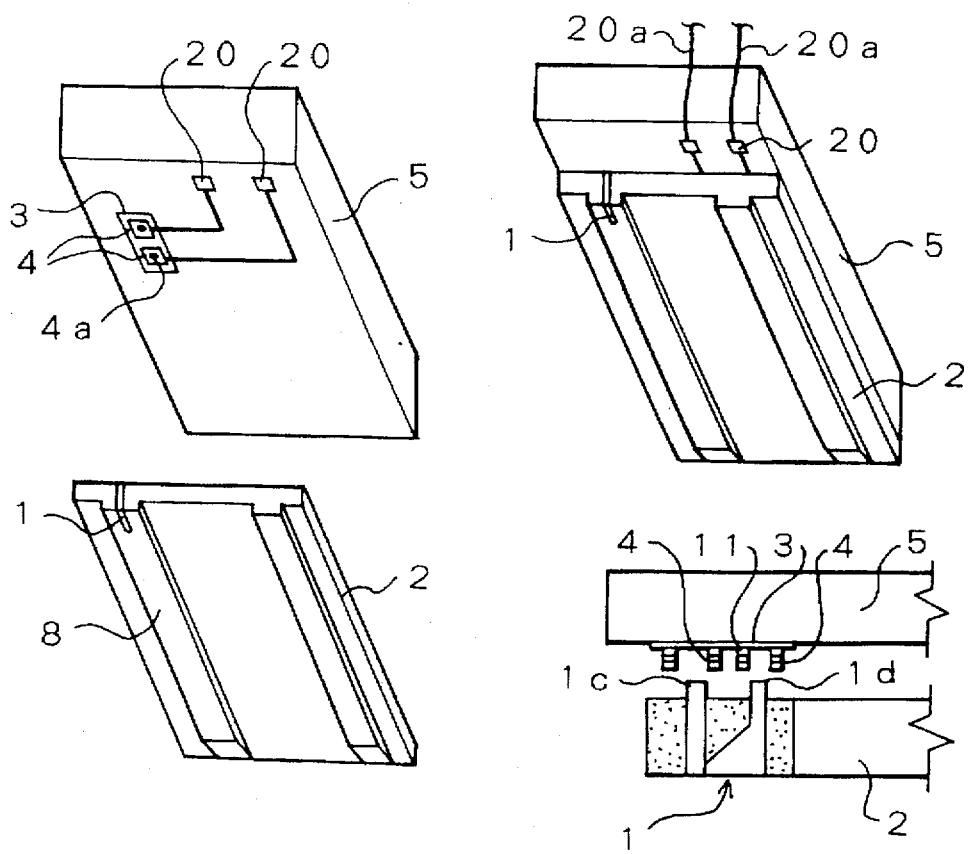
FIG. 5 is an exploded perspective view, an assembled perspective view, and an exploded sectional view of a second embodiment of the composite magnetic head.

In the embodiment of FIG. 2, the back board 5 has been sized to half of the flat surface of the slider plate 2, the back board 5 has covered the top surface of the cutout portion 2a of the slider plate 2, and the remaining top surface of the slider plate 2 has been formed so that the height becomes the same as that of the back board 5, but the back plate 5 may be shaped so as to cover the entire top surface of the slider plate 2 as shown in FIG. 5.

Also, on the back plate 5, two through-hole conductors 13 penetrate the back plate 5 from the surface where the coil layer is provided to the back surface, and electrode pads 13a, 13b are provided on the opposite ends of the through-hole conductor 13. The coil of the coil layer 4 is connected to the electrode pad 13a of the through-hole conductor 13 formed on the same side as the coil layer 4 and can be connected from the electrode pad 13b on the back surface side (side opposite to the magnetic recording medium side) of the back board 5 to an external circuit which is connected to the main body of a rigid disk unit.

Note that an electrode pad may be provided only on the side opposite to the magnetic recording medium side of the through-hole conductor 13 and may be connected to the external circuit. The electrodes of the aforementioned coil layer 4 are separately arranged so that a write operation or a read operation can be selectively chosen. In addition, the aforementioned electrodes may be conducted to the coil layer 4 so that the number of turns is increased at the time of the read operation rather than at the time of the write operation, or a desired output can also be obtained by providing an electrode used for the intermediate tap of the coil layer. In order to provide these electrodes, the through-hole conductor 13 does not always need to be provided. For example, the electrodes may be provided on the end surface on the trailing edge of the slider plate of the back board 5 or on the side surface of the back board 5 substantially perpendicular to the magnetic recording medium.

An embodiment of FIG. 5 is constructed such that the wiring connection of the transducer elements can be made without providing the aforementioned through-hole conductor 13. For this purpose, the end portion of the transducer element side of a back board 5 is constructed so as to protrude a little from the end portion of a slider plate 2 (overhung state). As with the aforementioned embodiment, a back yoke 3, an insulating layer 11, and a coil layer 4 are formed at the position corresponding to the transducer elements of the back board 5. Electrodes 20 of a coil layer 4 are formed on the aforementioned protruding portion of the surface where the coil layer 4 in the back board 5 is provided, and the electrodes 20 are connected through lead wire 20a to an external circuit. Even in a magnetic head of a construction such as this, the elements of the aforementioned embodiment can be used as the elements which constitute the transducer elements, and therefore the slider plate 2 having a front magnetic core 1 at a predetermined position and the other corresponding parts are constructed in the same way as the aforementioned embodiment. In addition, even in the embodiment of FIG. 5, a through-hole conductor 13 such as the one shown in FIG. 2 and electrode pads 13a, 13b on the opposite ends may be provided. Furthermore, in the case of the embodiment of FIG. 2, the back board 5 may be formed into an overhanging shape, as shown in FIG. 5, and the electrodes may be provided on the same surface as the coil layer.

Now, the method of manufacturing the aforementioned composite magnetic head will be described.

Figure 6:
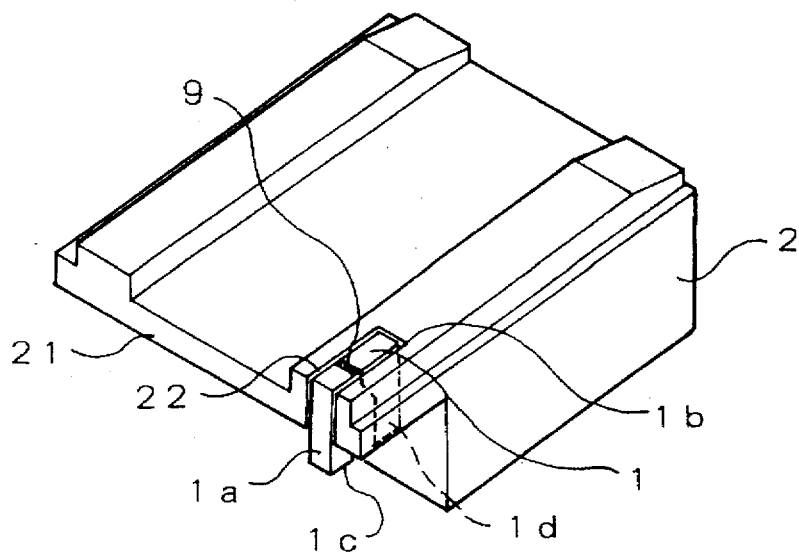
FIG. 6 is a part perspective view of the slider plate showing a method of manufacturing the composite magnetic head.

Initially, as shown in FIG. 6, a lateral groove 21 with a depth of less than the same degree as the height of a front magnetic core 1 is made in the slider discharge end of one air rail 8 of a slider board 2 in the width direction, and a longitudinal groove 22 is provided in the direction crossing with the lateral groove 21 at nearly right angles. The front magnetic core 1, provided with a magnetic gap 9 between a pair of magnetic core portions 1a and 1b is inserted into the longitudinal groove 22 of the aforementioned slider plate 2 and is secured with glass material G. Thereafter, the front magnetic core 1 is cut parallel to the flat surface of the slider plate at the height where a back yoke 3 is connected to the aforementioned slider plate 2, and the slider plate 2 on the side opposite to the magnetic recording medium side and part of the front magnetic core 1 are removed. With the removal, the front magnetic core 1 is slightly protruded from the back surface of the slider plate 2 which is the side opposite to the magnetic recording medium side, whereby connecting protrusion portions 1c and 1d are formed.

Figure 8:
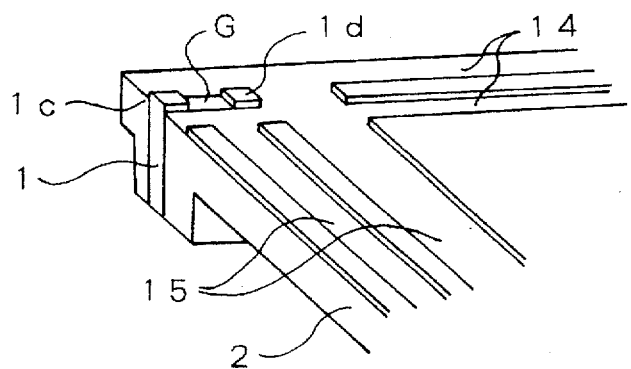
FIG. 8 is a part perspective view of the slider plate showing another method of manufacturing the composite magnetic head.
Figure 9:
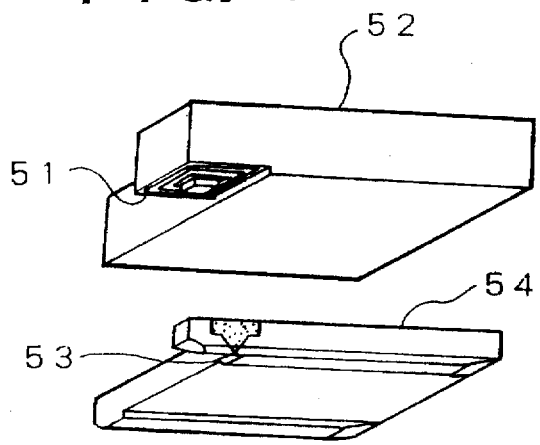
FIG. 9 is an exploded perspective view of a conventional magnetic head of the type where two upper and lower divided portions are joined and assembled.
Figure 10:
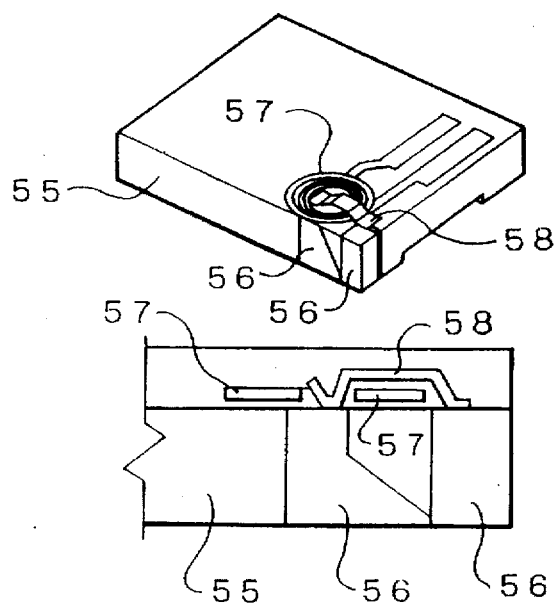
FIG. 10 is a perspective view and a sectional view of a conventional magnetic head of the type where two magnetic core portions are connected together by a back-surface magnetic core.

The connecting protrusion portions 1c and 1d may be formed by a method shown in FIG. 8 in addition to the aforementioned method. In such a case, a cut groove for embedding a front magnetic core 1 is provided at a predetermined position of a slider plate 2. The front magnetic core 1 is inserted into the groove so that the height becomes the same height of the back surface of the slider plate 2, and the front magnetic core i is secured with glass material G. Then, the connecting protrusion portions 1c and 1d are formed by forming two grooves 14 and two grooves 15 in the slider back surface in crossing directions so that the back surface portion of the front magnetic core 1 protrudes.

Next, in order to connect the aforementioned pair of connecting protrusion portions 1c and 1d, the back yoke 3 is formed on the back board 5 into a flat surface shape by a thin-film forming method such as vacuum deposition or plating. Also, an insulating layer 11 is formed on the back yoke 3 and the periphery. On the insulating layer 11, a hole is bored in correspondence with the position at which the back yoke 3 is joined to the front magnetic core 1. Furthermore, a photoresist film is coated on the aforementioned insulating layer 11, and a pattern is formed by exposure. Thereafter, a coil layer 4 is formed by the thin-film forming method so that it has center holes 4a into which the aforementioned pair of connecting protrusion portions 1c and 1d are inserted.

Figure 7:
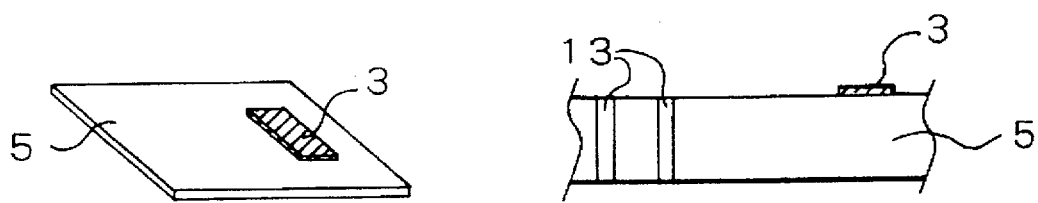
FIGS. 7(a)–7(h) are an explanatory diagram showing a method of forming a back yoke and a coil layer on a back board.
Figure 7:
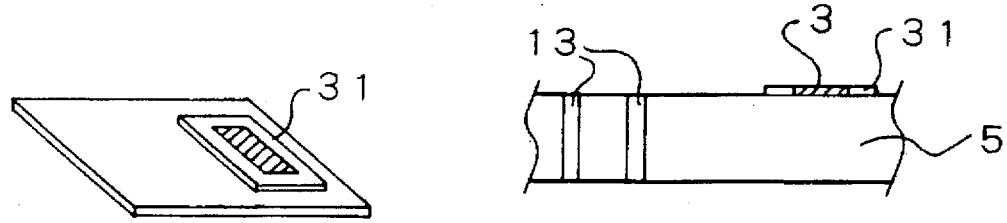
Figure 7:
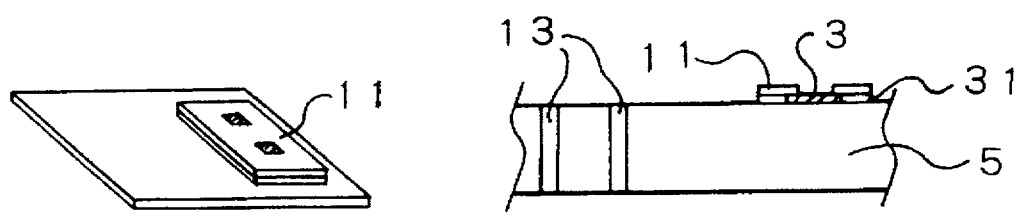
Figure 7:
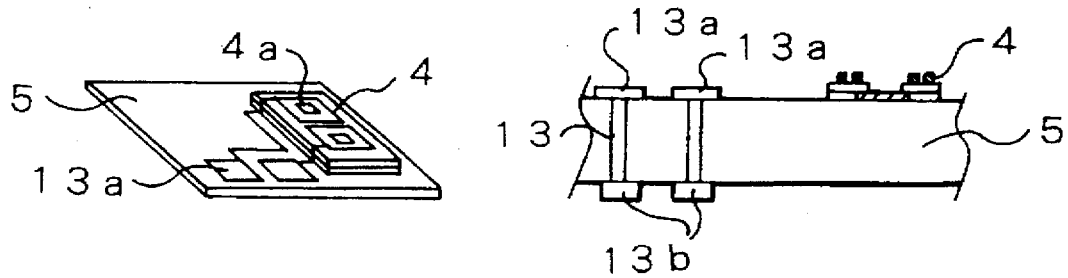

Now, the method of forming the back yoke 3 and the coil layer 4 on the back board 5 will be described in detail with FIG. 7.

A metal magnetic film is formed by the thin film forming method such as vacuum deposition or plating so that the back yoke 3 is formed on the nonmagnetic back board 5 at a predetermined position (FIG. 7(a)). Next, a photoresist film is applied around the back yoke 3 and is patterned, and the resist film is hardened by hard baking, whereby a first insulating layer 31 is formed (FIG. 7(b)). A second insulating layer 11 is formed on the first insulating layer 31 (FIG. 7(c)).

The second insulating layer 11 is then plated with copper (Cu), thereby forming a coil layer 4 having center holes 4a. In this case, as a conduction film (seed film) used when plating isolated patterns, a film of Cr 20 nm and a film of Cu 80 nm are formed on the entire surface by sputtering. After the resist is applied on the entire surface, it is patterned so that a window is formed in the areas of the coil layer 4 which are plated. The window is plated with Cu by a thickness of 3 μm. When this occurs, an electrode pad 13a is likewise formed on the end portion of a through-hole conductor 13 and furthermore a lead line connecting the electrode pad 13a,13b and the coil layer 4 is plated (FIG. 7(d)).

Figure 7E:
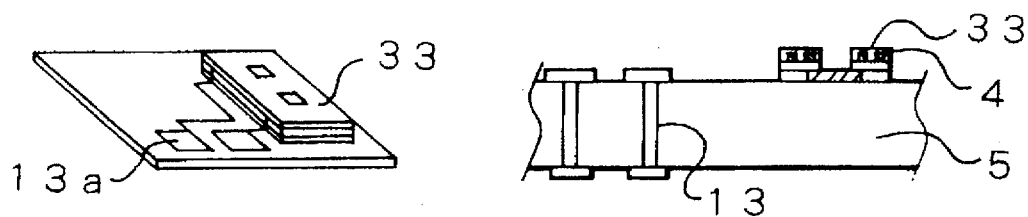
Figure 7F:
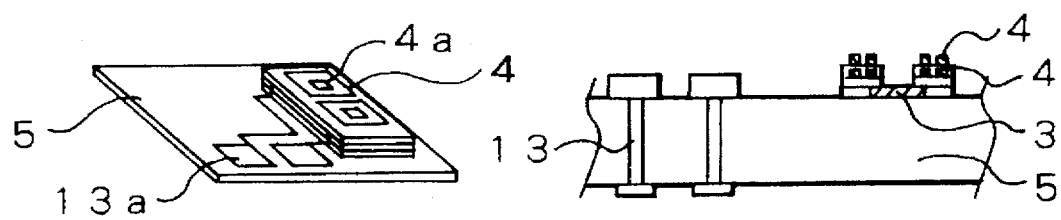
Figure 7G:
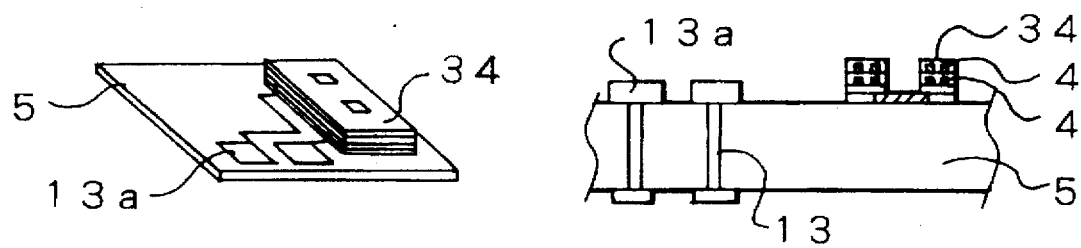
Figure 7H:
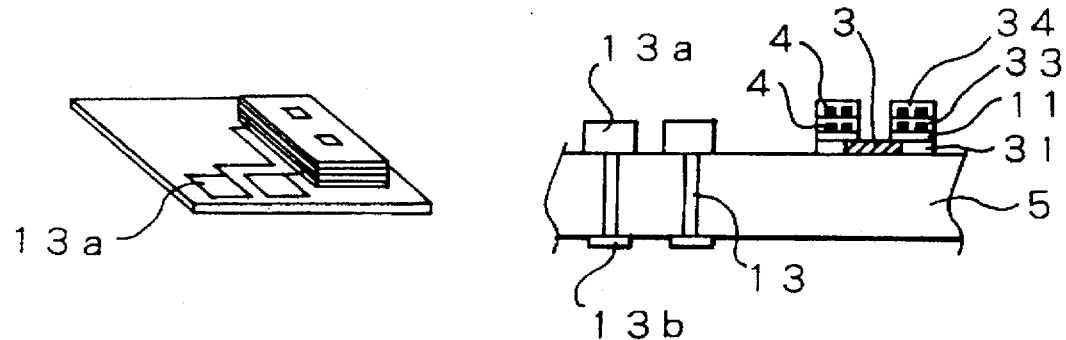

A third insulating film 33 is then formed on the coil layer 4 in the same way as the aforementioned insulating film (FIG. 7(e)). A second coil layer 4 which is connected to a first coil layer 4 is made on the third insulating film 33 in the same as the foregoing (FIG. 7(f)). Note that the coil layer 4 has two turning portions corresponding to two connecting protrusion portions 1c and 1d and furthermore is balanceably wound. Thereafter, a fourth insulating film 34 is made on the second coil layer 4 in the same way the foregoing (FIG. 7(g)). Then, Cu is plated on the electrode pad 13a, and furthermore, Au is plated on the plated Cu (FIG. 7(h)).

Thereafter, the back board 5 is superimposed and joined to the slider plate 2 so that the aforementioned connecting protrusion portions 1c and 1d are inserted into the center holes 4a of the coil layer 4, and the back yoke 3 is connected to the aforementioned pair of the connecting protrusion portions 1c and 1d of the magnetic core, thereby constituting a magnetic circuit. Finally, the coil layer 4 is disposed so as to turn around the connecting protrusion portions, thereby completing a composite magnetic head.

In the aforementioned composite magnetic head of the present invention, the front magnetic core which is provided in the slider plate is protruded slightly from the back surface of the slider plate, and the protruding portion of the front magnetic core is joined by the back yoke formed into a flat shape, whereby the magnetic circuit is constructed. Therefore, a smaller-sized composite magnetic head can be readily manufactured. In addition, the coil is formed as a thin coil layer. Therefore, the sizes of the magnetic circuit and the coil portion are reduced and the inductance can be made low, and the recording and regenerative characteristic of a magnetic disk unit can be enhanced. Furthermore, because the back board having both the back yoke and the coil layer is formed with nonmagnetic material and the magnetic flux rarely leaks from the magnetic core to other portions, an occurrence of noise can be prevented.

In addition, the electrodes of the coil layer are disposed so that a desired magnetic head characteristic is obtainable. Furthermore, the through-hole conductor is provided on the slider plate so that the wiring connection can be performed from the back side of the back board to the electromagnetic conversion elements. Therefore, wiring is easy and there is no trouble that a wire contacts a magnetic recording medium.

In the aforementioned method of manufacturing a magnetic head, the front magnetic core is secured at a predetermined position of the slider plate, and then by cutting out part of the front magnetic core, the connecting protrusion portions of the front magnetic core can be easily formed. Also, by connecting the connecting protrusion portions by the flat-shaped back yoke, a magnetic circuit can be constituted. In addition, by turning the coil layer around the connecting protrusion portions, transducer elements can be constituted. In this way, a small-sized magnetic head can be easily made.

We claim:

1. In a composite magnetic head comprising a slider plate and a back board, the improvement wherein:

said slider plate is formed with a nonmagnetic substance and is provided with air rails at its recording-medium opposing side;

a front magnetic core with a magnetic gap is disposed so that said magnetic gap is opposed to a magnetic recording medium, said magnetic gap being formed by bonding a pair of magnetic core members of said front magnetic core to a discharge end side of said slider plate;

said back board is formed with a back yoke of a soft magnetic film and a coil layer and also is formed with a plurality of electrodes electrically connected to said coil layer, the back yoke and the coil layer being formed on said back board;

an end of at least one of the core members of said front magnetic core opposite said magnetic gap protrudes from said slider plate a predetermined distance to allow said protruding end to magnetically interact with said coil layer; and said slider plate and said back board are joined and fixed so that a transducer portion is constituted by said front magnetic core, said back yoke, and said coil layer.

2. The composite magnetic head as set forth in claim 1, wherein a cutout portion is formed in the side opposite to the recording-medium opposing side of said slider plate and wherein said back board is joined and fixed to said cutout portion.

3. The composite magnetic head as set forth in claim 1, wherein said coil layer constitutes a coil which is turned around each protrusion portion of said front magnetic core and wherein the height of said coil layer is formed to the same as a dimension of said protrusion portion or less than the dimension.

4. The composite magnetic head as set forth in claim 1, wherein said electrodes of the coil layer are disposed so that a write operation and a read operation can be selectively chosen.

5. The composite magnetic head as set forth in claim 4, wherein said electrodes are electrically connected to said coil layer so that the number of turns is increased at the time of the read operation rather than at the time of the write operation.

6. The composite magnetic head as set forth in claim 1, wherein said back board is formed with a through-hole conductor electrically connected to said coil layer and wherein said electrodes are disposed so as to appear on the side opposite to the recording-medium opposing side and are electrically connected to said through-hole conductor.

7. The composite magnetic head as set forth in claim 6, wherein a magnetic recording medium discharge side of said back board overhangs from said slider plate.

8. The composite magnetic head as set forth in claim 1, wherein said electrodes are disposed on a side surface of said back board, excluding a joining surface for joining said slider plate, and said side surface is substantially perpendicular to said magnetic recording medium.

9. The composite magnetic head as set forth in claim 8, wherein a magnetic recording medium discharge side of said back board overhangs from said slider plate.

* * * * *